UNITED STATES PATENT OFFICE.

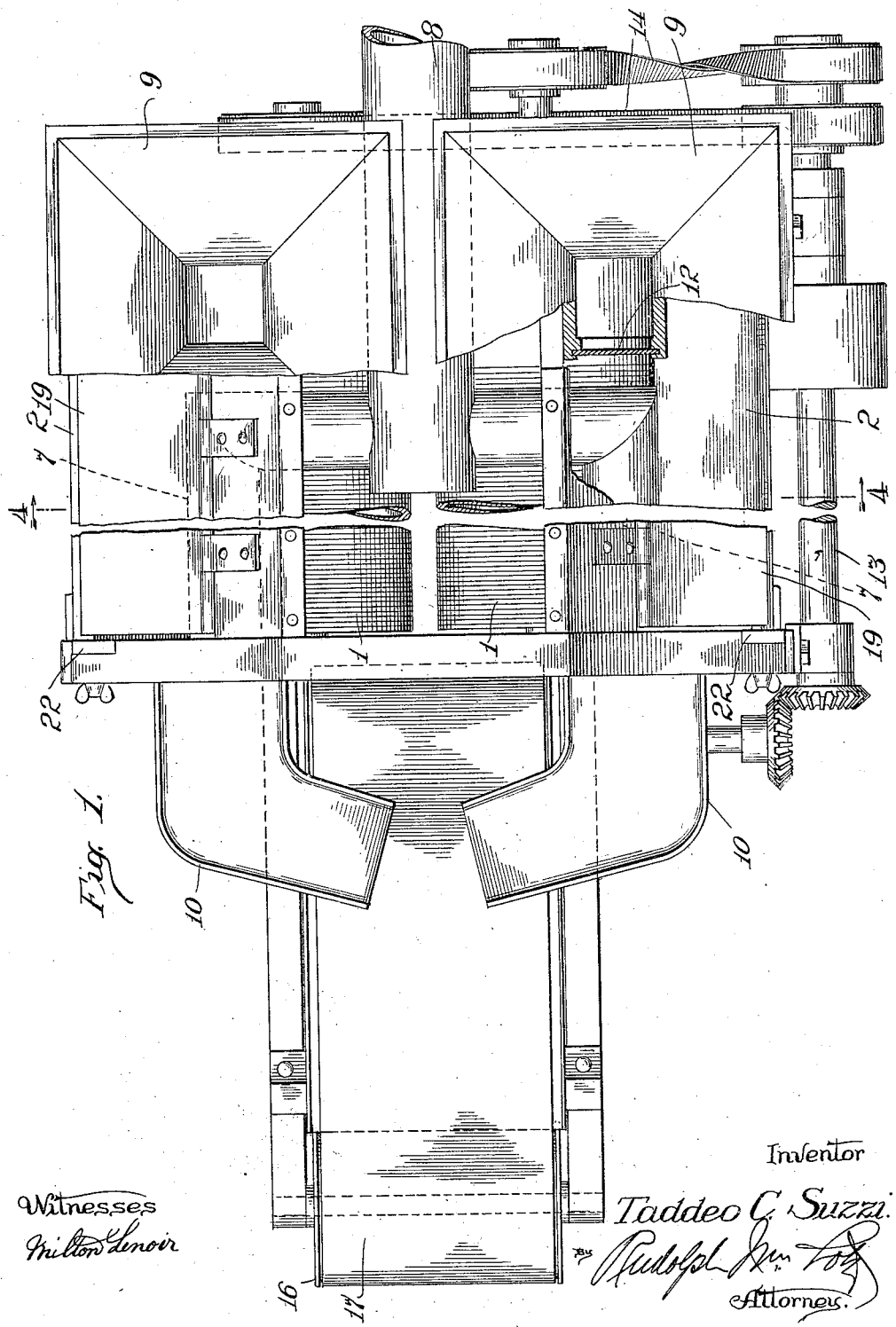

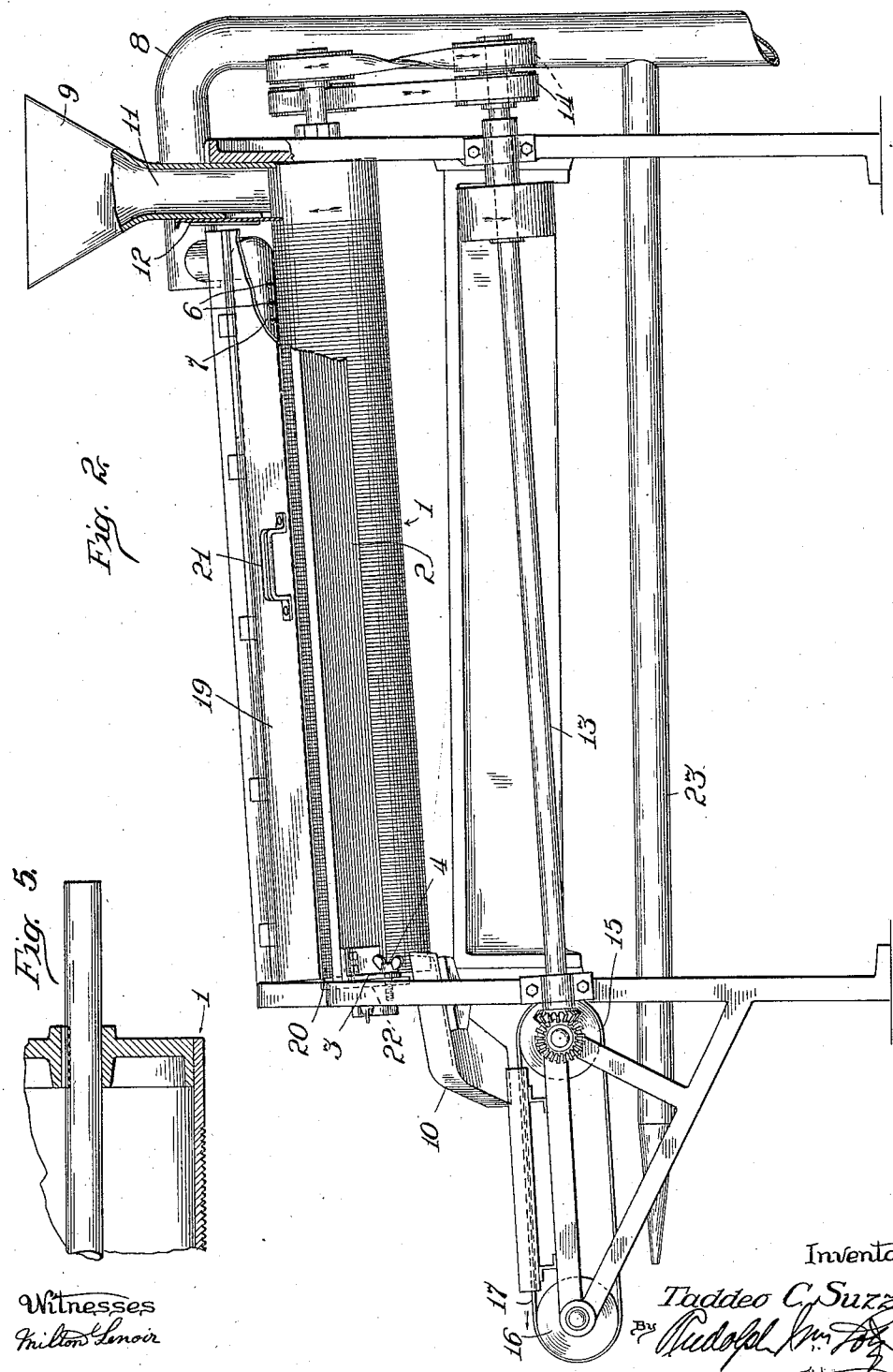

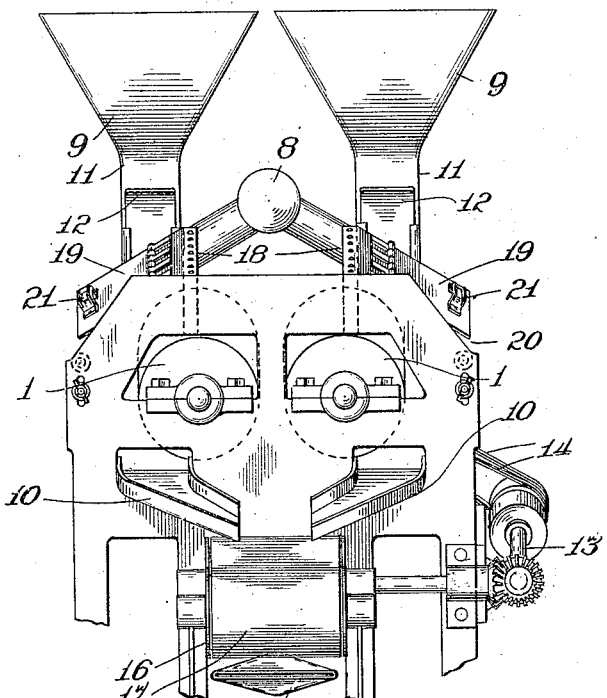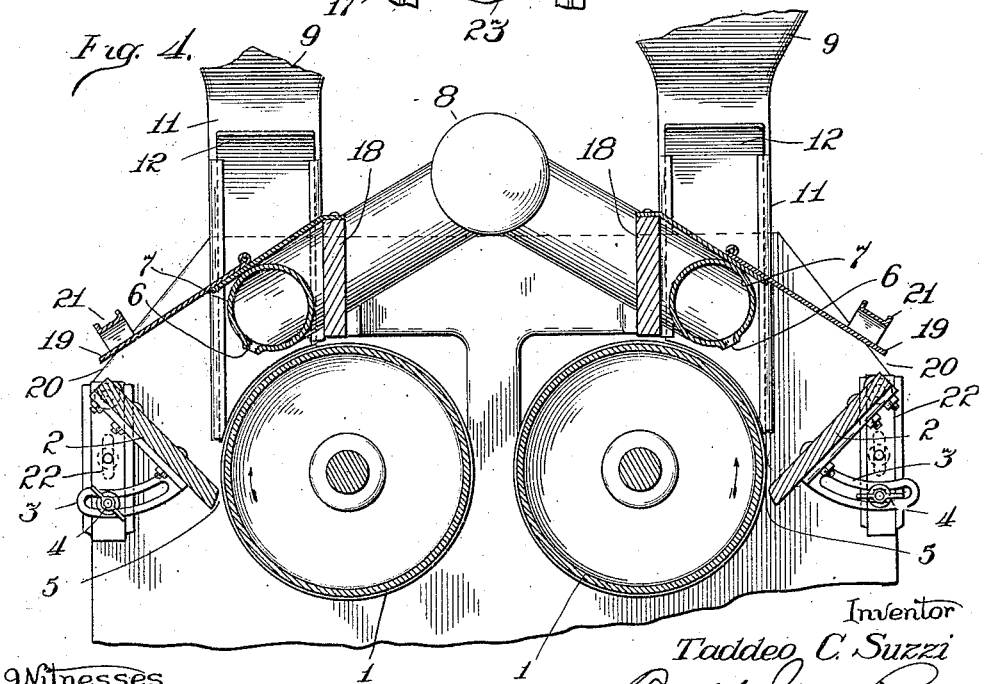

TADDEO C. SUZZI, OF CHICAGO, ILLINOIS.

PEANUT-BLANCHING MACHINE.

1,295,631. Specification of Letters Patent. Patented Feb. 25, 1919.

Application filed August 18, 1917. Serial No. 186,943.

*To all whom it may concern:*

Be it known that I, TADDEO C. SUZZI, a citizen of the United States, residing at Chicago, in the county of Cook and State of Illinois, have invented certain new and useful Improvements in Peanut-Blanching Machines; and I do hereby declare the following to be a full, clear, and exact description of the invention, such as will enable others skilled in the art to which it appertains to make and use the same.

This invention relates to improvements in peanut blanching machines, and has for its particular object to provide a machine of this character which will blanch peanuts very rapidly and economically without splitting or otherwise injuring the same.

The invention consists essentially in providing a peanut blanching machine in which the blanching is effected by a light frictional contact between the peanuts to be blanched and mechanical means for cutting and removing the membranes therefrom, and in maintaining the peanuts in contact with the last-named elements by means of air currents acting also to separate the loosened membranes from the nuts and discharging them from the machine.

The particular objects of the invention are, therefore, to provide a machine of this character in which the blanching is effected by the combined mechanical and pneumatic means acting not only to effect a severance of the membranes from the nut kernels, but also discharging the latter from the machine, and to provide means acting simultaneously to sever the membranes from the nut kernels and effecting a movement of the kernels to discharge end of the machine.

A further object of the invention is to provide means for dropping the blanched peanuts into a receptacle through an air current serving to separate the membranes from the nuts.

Another object of the invention is to provide adjustable means for varying the time interval of passage of the nut kernels from the inlet to the discharge end of the machine without varying the speed of the mechanical blanching means employed.

Other objects of the invention will be readily understood from the following description.

In the accompanying drawings illustrating a suitable embodiment of the invention:

Figure —1— is a top plan view partly broken away of a peanut blanching machine constructed in accordance with the invention.

Fig. —2— is a side elevation of the same partly in section.

Fig. —3— is an end elevation of the same looking at the discharge end of the machine.

Fig. —4— is a vertical transverse section of the same on the line 4—4 of Fig. —1—.

Fig. —5— is a fragmentary detail section of one end of one of the rollers employed.

The blanching of peanuts is effected by means of cylindrical rolls 1 of which there are preferably two mounted in the machine, rotating in opposite directions so that their upper halves rotate toward each other. Each of these cylinders is provided on its outer circumferential face with a helical thread of the ordinary or V-shaped variety, extending from a point adjacent to the end of each cylinder to the other end thereof. Associated with each cylinder and having its lower end disposed contiguous to the outer circumferential face thereof slightly below the horizontal diametric plane of each cylinder is an inclined plate 2, upon which the peanuts to be blanched are adapted to rest, and by means of which they are held in surface contact with the cylinders. The said plates 2 are pivotally supported at their upper outer edges, and at their lower ends are supported on arcuate arms 3 provided with arcuate slots, and which are engaged by thumb screws 4 threaded into a rigid part of the machine for rigidly holding said arms 3 in any position to which they may be turned. A space 5 is provided between the lower edges of the plates 2 and the cylindrical surfaces through which splits or halves of peanuts are adapted to drop, it being obvious that suitable receptacles for receiving said splits or halves may be provided.

It will be noted that the tendency of the cylinders 1 will be to lift the nuts coming in contact therewith, and in order to resist this tendency, and to prevent the nuts from being thrown to any considerable height and dropping forcibly back, which tends, obviously, to split them, I provide means for directing a current of air in the direction opposite to that in which the cylinders tend to throw the nuts, such air current being delivered from the perforations 6 of pipes 7 connected with a suitable source of air under pressure, such as a large blower or compressor. Both pipes connect with a larger air-supply pipe 8 extending from the delivery end of the blower or compressor. The cylinders 1 are disposed parallel with each other, but are slightly inclined, as are also the longitudinal edges of the plates 2, so that these parts will coact to cause the peanuts to move gradually the entire length of the cylinders and plates 2, from the point of delivery from the hoppers 9 to the discharge spouts 10 above which the ends of the plates 2 and cylinders 1 are disposed. The feeding of the nuts longitudinally of the cylinders is further promoted preferably by so arranging the threads with respect to the direction of rotation of the cylinders 1 as to cause such threads to act somewhat in the manner of a spiral conveyer or helix to effect a movement of the nuts longitudinally of said cylinders.

Both the cylinders 1 are smooth, that is, devoid of threads, at their uppermost ends, said ends being disposed below or at the lower ends of the feed spouts 11 of the hoppers 9. Each of the latter is provided with a suitable slide-valve 12 of well-known construction, to control the feed of nuts from the hoppers into the troughs formed by the plates 2 and the opposing surfaces of the cylinders 1. The nuts are preferably fed in batches so that only a comparatively small stream thereof will be contained at all times in said troughs, it being found that the machine will operate most efficiently if the nuts are not contained to any considerable depth in said troughs.

The cylinders 1 are rotated at a comparatively high speed and are suitably geared to a source of power such as the countershaft 13 and belts 14 trained over pulleys on said countershaft, and upon the shafts projecting from the upper ends of the rollers. The countershaft is in turn geared to a motor, and is also geared to the drum 15 over which and an idle drum 16, a conveyer belt 17 is trained. The discharge troughs 10 into which the troughs formed between the plates 2 and cylinders 1 discharge are disposed to discharge upon the belt 17 which delivers the nuts into a receptacle adapted to be removably disposed underneath the drum or pulley 16. A pipe 23 connected with the source of supply of air under pressure is disposed with its nozzle underneath the said conveyer belt 17, and projects a current of air horizontally between said belt 17 and the upper end of the receptacle for receiving the nuts; thus causing a separation of the nuts and the membranes removed therefrom.

It sometimes happens during the operation of the machine that, despite the action of the air blast discharged from the pipe 7, nuts will be carried up on the cylinders, and to prevent the same from being discharged from the machine between the cylinders, I provide guard plates 18 which are vertically disposed substantially in the vertical plane of the axis of each cylinder, and the lower edges of which are disposed so nearly contiguous to the cylinder surfaces as to leave insufficient space for the passage of nuts or splits thereunder. As the nuts thus carried up attain a considerable speed of travel, they will rebound upon striking the guard plates 18 and drop back into the troughs between the plates 2 and the cylinders and be further acted upon. It also happens sometimes that nuts are thrown upwardly into the space between the pipe 7 and the upper edge of the plate 2, and in order to prevent them from being thrown completely out of the trough, I provide a hinged cover 19 for the upper end of the trough which is so disposed as to provide an open slot 20 between the outer edge of said cover and the upper edge of the plate 2 for the escape of air and membranes carried thereby. The cover is provided with a handle 21 by means of which it may be raised at any time for purposes of observing the supply of peanuts in the troughs and the action of the machine thereon.

Occasionally peanuts are encountered having membranes which adhere very closely thereto and are extraordinarily difficult to remove. In that event it is usually necessary to subject such peanuts to the action of the blanching means for a longer period of time than is ordinarily necessary. In order to increase the duration of the blanching operation, the inclination of the bottom of the trough formed between the cylinders and plates 2 requires to be decreased. This I accomplish by raising the ends of the plates 2 contiguous to the lower ends of the rollers 1. Suitable adjusting means are provided for this purpose, as shown in Fig. —3— consisting of plates 22 vertically movable in guides 24 rigid with the frame of the machine and into which the thumb screws 4 are threaded. Each plate 22 is equipped with a threaded projection, which extends through a vertical slot in the lower end wall of each trough and receives a thumb nut 26 by means of which the plate 22 is supported at any desired elevation. By causing the lower edges of the plates 2 to extend substantially horizontally the rapidity of movement of the peanuts through the trough will be substantially that of the speed of longitudinal movement imparted thereto by the threads of the cylinders, whereas ordinarily the travel of the peanuts is equal to the last-named speed plus that due to the inclination of the lower edges of the plates 2.

While I have shown a suitable embodiment of the invention in the accompanying drawings, it will be observed, of course, that the same may be changed and varied in details of construction without departing from the invention as defined in the appended claims.

I claim as my invention:

1. A peanut blanching machine including a rotatable cylinder having a helical grooved exterior surface presenting closely spaced continuous sharp-edged formations adapted to cut the membranes of peanuts, and means for maintaining peanuts in light contact with said surface during rotation of said cylinder.

2. A peanut blanching machine including a rotatable cylinder having helical sharp edged ribs on its exterior surface, and means for maintaining peanuts in light contact with said surface during rotation of said cylinder.

3. A peanut blanching machine including a rotatable cylinder having an exterior threaded surface, and means for maintaining peanuts in light contact with said surface during rotation of said cylinder.

4. A peanut blanching machine including a rotatable cylinder having an exterior threaded surface presenting sharp-edged ridges, and means for maintaining peanuts in light contact with said surface during rotation of said cylinder.

5. A peanut blanching machine including a rotatable cylinder having a helical grooved exterior surface, and an inclined plane peanut-supporting surface extending substantially parallel with the axis of said cylinder and having its lower edge disposed contiguous to the cylinder surface.

6. A peanut blanching machine including a rotatable cylinder having a helical grooved exterior surface, and an inclined plane peanut-supporting surface extending substantially parallel with the axis of said cylinder and having its lower edge disposed contiguous to the cylinder surface, there being a free space between said lower edge and said cylinder through which splits are adapted to pass.

7. A peanut blanching machine including a rotatable cylinder having a helical grooved exterior surface, and an inclined plane peanut-supporting surface extending substantially parallel with the axis of said cylinder and having its lower edge disposed contiguous to the cylinder surface, the latter coacting with said supporting surface to constitute a peanut trough, said cylinder rotatable in a direction to tend to raise the peanuts from the bottom of said trough.

8. A peanut blanching machine including a rotatable cylinder having a helical grooved exterior surface, and an inclined plane peanut-supporting surface extending substantially parallel with the axis of said cylinder and having its lower edge disposed contiguous to the cylinder surface, the latter coacting with said supporting surface to constitute a peanut trough, said cylinder rotatable in a direction to tend to raise the peanuts from the bottom of said trough, there being a free space between said lower edge and said cylinder through which splits are adapted to pass.

9. A peanut blanching machine including an inclined trough through which the peanuts to be blanched are adapted to travel, one wall of said trough constituting a rotatable element adapted to cut the membranes from the peanuts maintained in contact therewith by the other wall of said trough, the direction of rotation of said element being such as to tend to lift the peanuts out of contact with the said other wall of the trough.

10. A peanut blanching machine including an inclined trough through which the peanuts to be blanched are adapted to travel, one wall of said trough constituting a rotatable element adapted to cut the membranes from the peanuts maintained in contact therewith by the other wall of said trough, said element rotatable in a direction to raise peanuts from the trough bottom, and means for projecting an air current into said trough to oppose the lifting of peanuts by said rotatable element.

11. In a peanut blanching machine the combination with a traveling element adapted to fracture and remove peanut membranes, of a peanut-supporting element adapted to maintain peanuts by gravity in contact with said traveling element, and fluid pressure means coacting with said supporting element for maintaining said peanuts in contact with said traveling element.

12. In a peanut blanching machine the combination with a traveling element adapted to fracture and remove peanut membranes, of a peanut-supporting element adapted to maintain peanuts by gravity in contact with said traveling element, and fluid pressure means coacting with said supporting element for maintaining said peanuts in contact with said traveling element, and separating the free membranes from the mass of peanuts and ejecting the same from the machine.

13. In a peanut blanching machine the combination with a traveling element adapted to fracture and remove peanut membranes, of a peanut-supporting element adapted to maintain peanuts by gravity in contact with said traveling element, and disposed relatively to the direction of travel of the latter as to cause peanuts supported on said supporting element to be moved away from the latter, and fluid-pressure means coacting with said supporting element for maintaining said peanuts in contact with said traveling element.

14. In a peanut blanching machine the combination with a traveling element adapted to fracture and remove peanut membranes, of a peanut-supporting element adapted to maintain peanuts by gravity in contact with said traveling element, and disposed relatively to the direction of travel of the latter as to cause peanuts supported on said supporting element to be moved away from the latter, and fluid-pressure means coacting with said supporting element for maintaining said peanuts in contact with said traveling element, and separating the free membranes from the mass of peanuts and ejecting the same from the machine.

15. In a peanut blanching machine, a rotatable element for fracturing and removing membranes, constituting one wall of an inclined peanut-containing trough, a canted plate constituting the other wall thereof and adapted to cause the peanuts supported thereon to contact by gravity with the surface of said rotatable element, the latter tending during rotation to lift the peanuts from the bottom of the trough and the inclination of the latter causing each lifted peanut to drop back into the trough at a point nearer the lowermost end of the latter, whereby the peanuts are caused to move gradually from end to end of said trough.

16. In a peanut blanching machine, a rotatable element for fracturing and removing membranes, constituting one wall of an inclined peanut-containing trough, a canted plate constituting the other wall thereof and adapted to cause the peanuts supported thereon to contact by gravity with the surface of said rotatable element, the latter tending during rotation to lift the peanuts from the bottom of the trough and the inclination of the latter causing each lifted peanut to drop back into the trough at a point nearer the lowermost end of the latter, whereby the peanuts are caused to move gradually from end to end of said trough, and a pipe arranged parallel with and above said trough and connected with a source of supply of air under pressure adapted to discharge an air blast into said trough for resisting upward throw of peanuts by said rotatable element.

TADDEO C. SUZZI.

Copies of this patent may be obtained for five cents each, by addressing the "Commissioner of Patents, Washington, D. C."